(12) United States Patent
Ko et al.

(10) Patent No.: US 11,966,538 B2
(45) Date of Patent: Apr. 23, 2024

(54) ELECTRONIC DEVICE INCLUDING TOUCH SENSOR IC AND OPERATION METHOD FOR SAME

(71) Applicant: SAMSUNG ELECTRONICS CO., LTD., Suwon-si (KR)

(72) Inventors: Seunghoon Ko, Suwon-si (KR); Hoondo Heo, Suwon-si (KR); Dongchul Kim, Suwon-si (KR); Jooyoung Park, Suwon-si (KR); Eunsung Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/881,259

(22) Filed: Aug. 4, 2022

(65) Prior Publication Data

US 2022/0374147 A1 Nov. 24, 2022

Related U.S. Application Data

(63) Continuation of application No. PCT/KR2021/001466, filed on Feb. 4, 2021.

(30) Foreign Application Priority Data

Feb. 7, 2020 (KR) .................. 10-2020-0014680

(51) Int. Cl.
*G06F 3/041* (2006.01)
(52) U.S. Cl.
CPC ...... *G06F 3/041662* (2019.05); *G06F 3/0412* (2013.01); *G06F 3/04164* (2019.05); *G06F 3/04184* (2019.05)
(58) Field of Classification Search
CPC .......... G06F 3/041662; G06F 3/04184; G06F 3/04164; G06F 3/0412
See application file for complete search history.

(56) References Cited

U.S. PATENT DOCUMENTS

| 2010/0110037 A1 | 5/2010 | Huang |
| 2010/0328265 A1 | 12/2010 | Hotelling |

(Continued)

FOREIGN PATENT DOCUMENTS

| JP | 2010-108472 A | 5/2010 |
| JP | 2017-111482 | 6/2017 |

(Continued)

OTHER PUBLICATIONS

International Search Report dated May 6, 2021, for PCT/KR2021/001466, 6 pp.

(Continued)

*Primary Examiner* — Peter D McLoone
(74) *Attorney, Agent, or Firm* — Nixon & Vanderhye, P.C.

(57) ABSTRACT

An electronic device according to an embodiment comprises: a display; a display-driving integrated circuit (IC) set to apply one or more driving signals to the display; a touch sensor including a plurality of electrodes; and a touch sensor IC configured to check an input position on the touch sensor, wherein the touch sensor IC is configured to: acquire, from the display-driving IC, a first vertical synchronization signal from among the one or more driving signals, provide a plurality of first measurement signals corresponding to a first phase at intervals of a first duration to at least a first portion of electrodes among the plurality of electrodes based on the acquisition of the first vertical synchronization signal, and, after providing the plurality of first measurement signals, provide a plurality of second measurement signals corresponding to a second phase, different from the first phase, at intervals of the first duration to at least a second portion of electrodes among the plurality of electrodes, wherein at least a portion of the application period of the plurality of first driving signals and the plurality of second driving signals (Continued)

can overlap with at least a portion of the application period of the one or more driving signals.

20 Claims, 13 Drawing Sheets

(56) References Cited

U.S. PATENT DOCUMENTS

| | | | |
|---|---|---|---|
| 2017/0168640 A1 | 6/2017 | Yamada et al. | |
| 2017/0308212 A1 | 10/2017 | Jin | |
| 2018/0348931 A1* | 12/2018 | Kim | G06F 3/04184 |
| 2019/0294310 A1 | 9/2019 | Lee et al. | |
| 2022/0027012 A1* | 1/2022 | Kim | G06F 3/0412 |

FOREIGN PATENT DOCUMENTS

| | | |
|---|---|---|
| KR | 10-1496183 | 2/2015 |
| KR | 10-1504031 | 3/2015 |
| KR | 10-2017-0121904 | 11/2017 |
| KR | 10-2018-0132232 | 12/2018 |
| KR | 10-2019-0112593 | 10/2019 |

OTHER PUBLICATIONS

Written Opinion of the ISA dated May 6, 2021, for PCT/KR2021/001466, 4 pp.
Office Action dated Feb. 27, 2024 in Korean Patent Application No. 10-2020-0014680 and English-language translation.

* cited by examiner

ELECTRONIC DEVICE INCLUDING TOUCH SENSOR IC AND OPERATION METHOD FOR SAME

CROSS-REFERENCE TO RELATED APPLICATIONS

This application is a continuation of International Application No. PCT/KR2021/001466 designating the United States, filed on Feb. 4, 2021, in the Korean intellectual Property Receiving Office and claiming priority to Korean Patent Application No. 10-2020-0014680, filed on Feb. 7, 2020, in the Korean Intellectual Property Office, the disclosures of which are incorporated by reference herein in their entireties.

BACKGROUND

Field

The disclosure relates to an electronic device including a touch sensor integrated circuit (IC) and an operation method thereof.

Description of Related Art

Electronic devices including touch screens have been actively introduced. An electronic device may display a screen including an object on a touch screen. A user may touch a point on the touch screen with a finger or a stylus pen, and the electronic device may detect the position of the touch on the touch screen. The electronic device may perform a function associated with the object corresponding to the detected position, and thus a user-friendly user interface may be provided to allow the user to operate the electronic device with a simple touch.

A touch panel included in the touch screen may include a plurality of electrodes. Because the electrodes may be conductors, mutual capacitance may be formed between the electrodes. For example, when the touch panel is implemented as a capacitive type, the electronic device may apply a driving signal to at least one electrode of the touch panel, that is, a driving electrode, and the driving electrode may form an electric field. The other electrodes may output electrical signals based on the electric field formed from the driving electrode. When the user places a finger near at least one electrode, the magnitude of an electrical signal output from the electrode near the finger may be different from that of a previous electrical signal. The electronic device may identify that the mutual capacitance has been changed based on the variation and detect the position of the touch based on electrodes having changed mutual capacitance.

Alternatively, the electronic device may measure the self-capacitance of each electrode. The electronic device may determine the position of the touch or information other than the touch identified based on the mutual capacitance, based on the measured self-capacitance.

An electronic device may include a touch sensor and a display. As small-sized thin electronic devices become popular, the physical distance between the touch sensor and the display gets smaller. When the distance between the touch sensor and the display is small, a signal applied to the touch sensor may be introduced as noise into the display or a display driving signal may be introduced as noise into the touch sensor, based on sharing of electrodes between the touch sensor and the display. The electronic device may perform synchronization such that a period during which the display driving signal is applied and a period during which mutual capacitance between electrodes of a touch sensor integrated circuit (IC) is measured are apart from each other by a predetermined time or longer. For example, when the display driving signal is applied with a first periodicity, the touch sensor IC may measure mutual capacitance (or self-capacitance) in synchronization with the first periodicity, thereby reducing the possibility of noise-incurred deterioration of the sensitivity of the touch sensor or the image quality of the display.

The electronic device may measure the self-capacitance (or mutual capacitance) of electrodes to identify whether noise exists, correct an input position, or measure additional information. The electronic device may set different frequencies for mutual capacitance measurement and self-capacitance measurement. Accordingly, for example, the mutual capacitance measurement may be synchronized with the display driving signal, whereas the self-capacitance measurement may not be synchronized with the display driving signal, which may cause flicker or screen flicker.

SUMMARY

Embodiments of the disclosure provide an electronic device and method of operating the same that may reduce flicker or screen flicker by inputting signals having different phases to a touch sensor.

According to various example embodiments, an electronic device may include: a display, a display driving integrated circuit (IC) configured to apply at least one driving signal to the display, a touch sensor including a plurality of electrodes, and a touch sensor IC configured to identify an input position on the touch sensor. The touch sensor IC may be configured to: obtain a first vertical synchronization signal among the at least one driving signal from the display driving IC, provide a plurality of first measurement signals corresponding to a first phase to at least some first electrodes of the plurality of electrodes with a first periodicity based on the first vertical synchronization signal being obtained, and provide a plurality of second measurement signals corresponding to a second phase different from the first phase to at least some second electrodes of the plurality of electrodes with the first periodicity, after providing the plurality of first measurement signals. At least some of application periods of the plurality of first driving signals and the plurality of second driving signals may overlap with at least part of an application period of the at least one driving signal.

According to various example embodiments, an electronic device may include: a display, a display driving integrated circuit (IC) configured to apply at least one driving signal to the display, a touch sensor including a plurality of electrodes, and a touch sensor IC configured to identify an input position on the touch sensor screen panel. The touch sensor IC may be configured to: measure first self-capacitance of each of at least some of the plurality of electrodes by applying first measurement signals corresponding to a first combination of phases to the at least some of the plurality of electrodes, and measure second self-capacitance of each of at least some of the plurality of electrodes by applying second signals corresponding to a second combination of phases to the at least some of the plurality of electrodes, after the first self-capacitance is measured by applying the first signals.

According to various example embodiments, a structure of an electronic device may include a substrate having a thin film transistor (TFT) structure configured to display at least one screen disposed thereon, an encapsulation layer disposed on the TFT structure, a touch sensor disposed on the encapsulation layer and including a plurality of electrodes, and an integrated circuit configured to identify an input position on the touch sensor and provide at least one driving signal to the TFT structure. The integrated circuit may be configured to: provide a plurality of first measurement signals corresponding to a first phase to at least some first electrodes of the plurality of electrodes with a first periodicity, based on the first vertical synchronization signal, and provide a plurality of second measurement signals corresponding to a second phase different from the first phase to at least some second electrodes of the plurality of electrodes with the first periodicity, after providing the plurality of first measurement signals. At least some of application periods of the plurality of first driving signals and the plurality of second driving signals may overlap with at least part of an application period of the at least one driving signal.

An electronic device and an operating method thereof according to various example embodiments may reduce flicker or screen flicker by inputting signals having different phases to a touch sensor.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
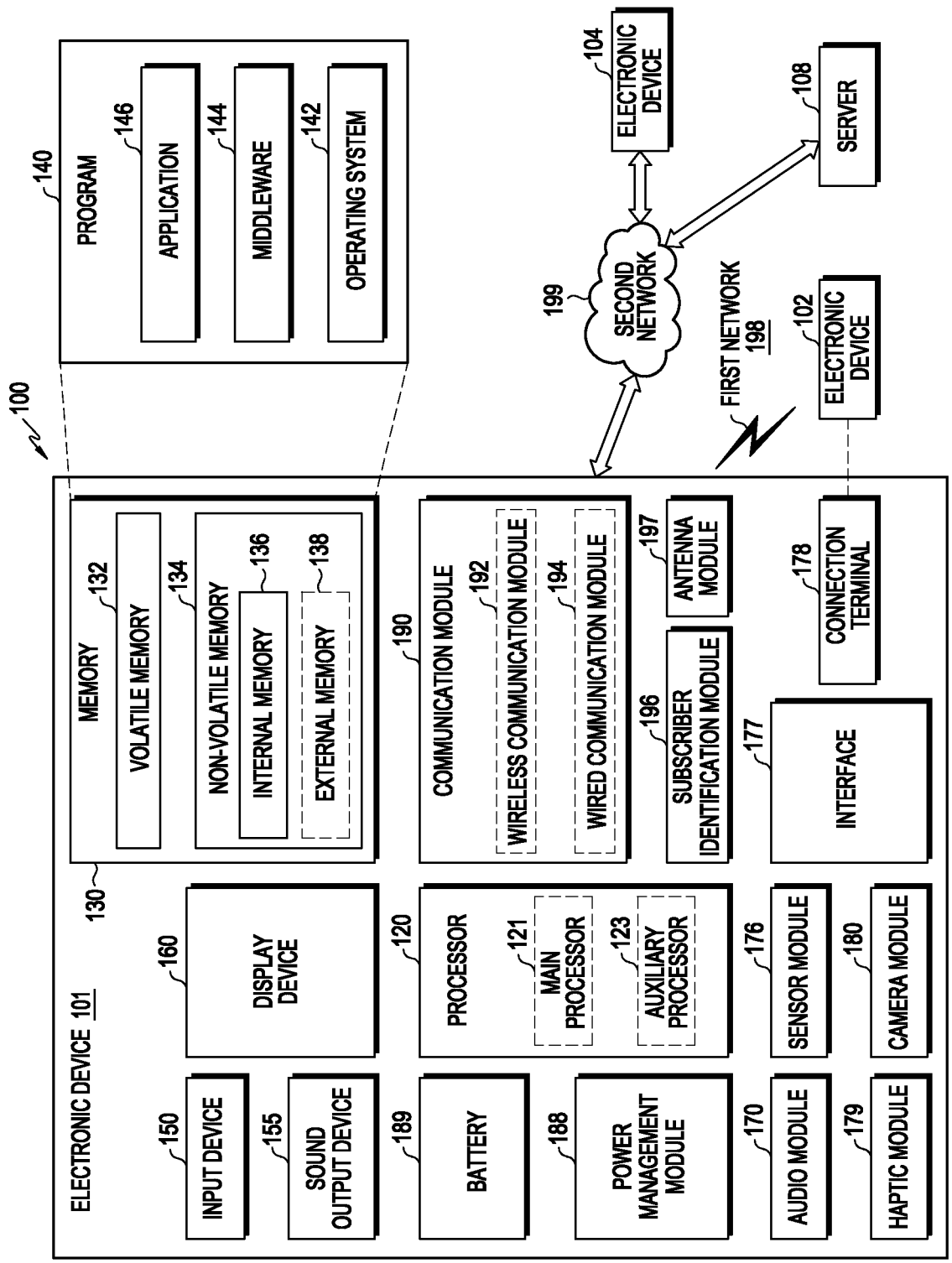
FIG. 1 is a block diagram illustrating an example electronic device in a network environment according to various embodiments.

FIG. 1 is a block diagram illustrating an example electronic device 101 in a network environment 100 according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
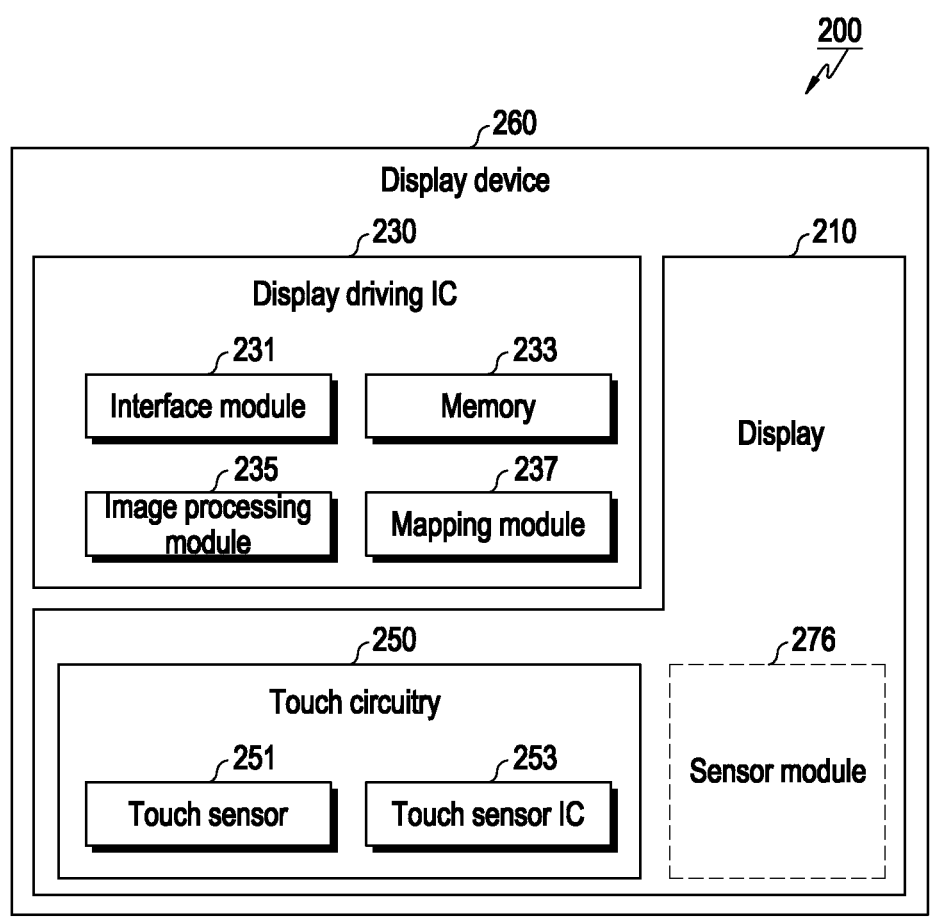
FIG. 2 is a block diagram illustrating an example configuration of a display device according to various embodiments.

FIG. 2 is a block diagram 200 illustrating an example configuration of the display device 160 according to various embodiments. Referring to FIG. 2, the display device 160 may include a display 210 and a display driver integrated circuit (DDI) 230 to control the display 210. The DDI 230 may include an interface module 231, memory 233 (e.g., buffer memory), an image processing module 235, and/or a mapping module 237. The DDI 230 may receive image information that contains, for example, image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate with touch circuitry 250 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) on at least part of the image data, for example, based at least on one or more characteristics of the image data or one or more characteristics of the display 210. The mapping module 237 may generate a voltage value or a current value corresponding to the image data pre-processed or post-processed by the image processing module 235. According to an embodiment, the generating of the voltage value or current value may be performed, for example, based at least in part on attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. For example, the touch sensor 251 may measure a change in a signal (e.g., a voltage, a quantity of light, a resistance, or a quantity of electric charges) corresponding to the certain position on the display 210. The touch sensor IC 253 may provide input information (e.g., a position, an area, a pressure, or a time) indicative of the sensed touch input or the hovering input detected to the processor 120. According to an embodiment, at least part (e.g., the touch sensor IC 253) of the touch circuitry 250 may be formed as part of the display 210 or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in a portion of a component (e.g., the display 210, the DDI 230, or the touch circuitry 250)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

According to various embodiments, at least part of the DDI 230 and at least part of the touch sensor IC 253 may be implemented as an integrated IC.

Figure 3:
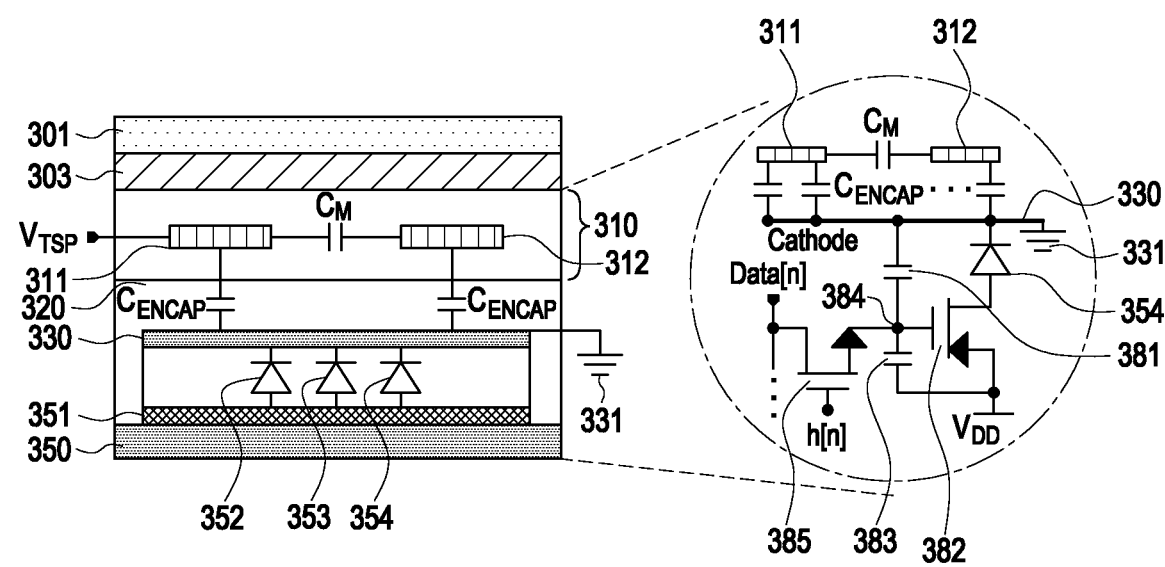
FIG. 3 is a diagram illustrating at least some components of an electronic device according to various embodiments.

FIG. 3 is a diagram illustrating at least some components of an electronic device according to various embodiments.

According to various embodiments, the electronic device 101 may include the display device 160 of an on-cell structure. The display device 160 may include a window 301 to contain internal elements. Although the window 301 may be formed of a substantially transparent material such as glass, the material of the window 301 is not limited. The window 301 may cover substantially the entire area of the display 210. The display device 160 may include a polarization layer 303 disposed under the window 301. The structure including the polarization layer 330 illustrated in FIG. 3 is merely an example, and a pol-less structure without the polarization layer 303, to which a color filter layer (e.g., a black pixel define layer (PDL) having a polarization function) and a color filter are applied, may also available. In various embodiments, when it is said that one component is disposed under or on another component, those skilled in the art will understand that this may refer, for example, to both components being placed in contact with each other or with an intermediary element in between.

According to various embodiments, a touch sensor 310 (e.g., the touch sensor 251) may be disposed under the polarization layer 303. The touch sensor 310 may include a plurality of electrodes 311 and 312. In the embodiment of FIG. 3, the plurality of electrodes 311 and 312 are shown as two. However, this is merely for convenience of description, and those skilled in the art will understand that the touch sensor 310 may include a plurality of electrodes extending in a first axial direction, a plurality of electrodes extending in a second axial direction, and insulation material may be disposed at intersections between the plurality of electrodes extending in both directions. Although each of the electrodes 311 and 312 may be formed as, for example, a metal-mesh, the material and/or shape of the electrodes 311 and 312 is not limited. Mutual capacitance CM may be formed between the electrodes 311 and 312.

According to various embodiments, an encapsulation layer 320 may be disposed under the touch sensor 310. In the electronic device 101 according to various embodiments, the encapsulation layer 320 may include, for example, encapsulation glass or an encapsulation thin film. Although the encapsulation thin film may be formed of a flexible organic material, its material is not limited. For example, the encapsulation thin film may be a structure in which a plurality of organic material layers and inorganic material layers are stacked. When the encapsulation thin film is formed of a flexible organic material, the display device 160 may be overall flexible. A structure in which the encapsulation thin film contains a display element may be referred to as youm on cell touch AMOLED (Y-OCTA). However, this is illustrative, and those skilled in the art will understand that various embodiments are applicable to any touch sensor as well the on-cell structure such as Y-OCTA. The encapsulation layer 320 may contain a substrate 350, a thin film transistor (TFT) structure 351, a plurality of diodes 352, 353, 354, and a ground layer 330. Encapsulation capacitance CENCAP may be formed between the ground layer 330 and the electrodes 311 and 312. When the encapsulation layer 320 is reduced in thickness or replaced with an encapsulation thin film, the physical distance between the electrodes 311 and 312 and a panel 330 may decrease, and the encapsulation capacitance may have a relatively large value.

Referring to the circuit diagram in FIG. 3, based on a horizontal line update signal h[n] being applied to the gate of a transistor 385, data Data[n] for the display may be transmitted to a node 384 via the transistor 385. A capacitor 381, a capacitor 383, the diode 354, and a transistor 382 may be coupled to the node 384, and a driving voltage VDD may be applied to the capacitor 383 and the transistor 382. The diode 354 and the capacitor 381 may be coupled to the ground plate 330 coupled to a ground 331. As described above, since the encapsulation capacitance CENCAP is formed between the ground plate 330 and the electrodes 311 and 312, it may be interpreted that the electrodes 311 and 312 and elements for the display are coupled to each other in terms of circuits. Accordingly, the data Data[n] for the display may be introduced to the electrodes 311 and 312 in a high period of the horizontal line update signal h[n]. This may also affect the mutual capacitance CM between the electrodes 311 and 312 and/or the self-capacitance of each of the electrodes 311 and 312. Since an input position is determined according to a change in the mutual capacitance CM and/or the self-capacitance of each of the electrodes 311 and 312, the effects on the mutual capacitance CM and/or the self-capacitance of each of the electrodes 311 and 312 may cause a decrease in the accuracy of input position measurement. Alternatively, electrical signals applied to the electrodes 311 and 312 may also be introduced to the gate of the transistor 382. As the voltage of the gate is affected, the quantity of light output from the diode 354 may also be affected, resulting in deterioration of image quality. Accordingly, a display driving signal and an input position measurement period need to be set without overlap to prevent/reduce the introduction of noise.

Figure 4A:
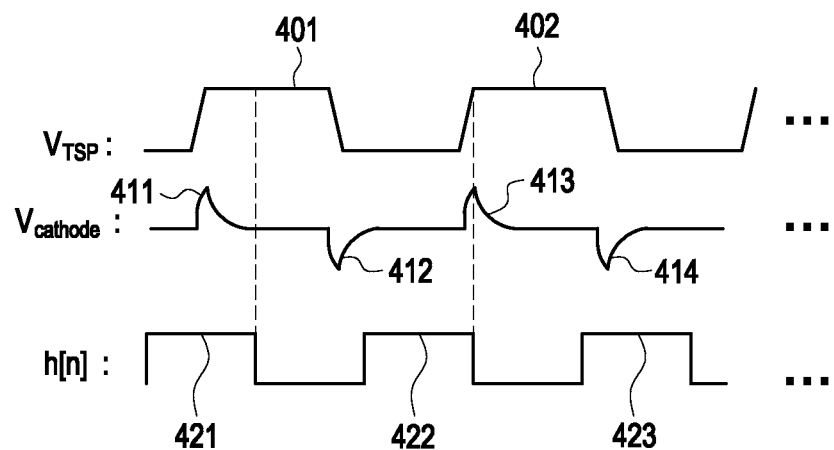
FIGS. 4A and 4B illustrate various example waveforms applied to or measured in a touch sensor integrated circuit (IC) and a display according to various embodiments.
Figure 4B:
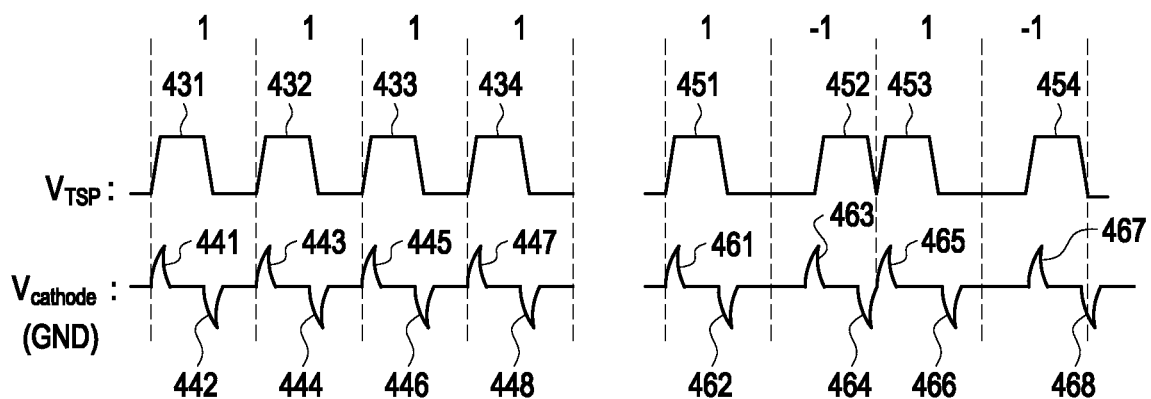

FIGS. 4A and 4B are waveforms applied to or measured in a touch sensor IC and a display according to various embodiments.

Referring to FIG. 4A, an electronic device (e.g., the touch sensor IC 253) according to various embodiments may apply measurement signals 401 and 402 to target electrodes to be measured in the touch sensor 251 to measure self-capacitance. While not shown, the touch sensor IC 253 may apply the measurement signals VTSP 401 and 402 to the target electrodes to be measured, and then measure the self-capacitance of each of the target electrodes to be measured, based on a signal output from the electrode. While the touch sensor IC 253 may detect noise, correct an input position determined based on mutual capacitance, determine the validity of the input position determined based on the mutual capacitance, or determine the input position itself, based on the measured self-capacitance, it will be understood by those skilled in the art that the method of using self-capacitance is not limited. Further, while a mutual capacitance measurement period is described as synchronized with a display driving signal and a self-capacitance measurement period is described as asynchronous with the display driving signal, this is an example. The touch sensor IC 253 according to various embodiments may synchronize the self-capacitance measurement period with the display driving signal and set the mutual capacitance measurement period independently of the display driving signal. It will be understood by those skilled in the art that the characteristics of a measurement signal for self-capacitance measurement described below may be replaced with the characteristics of a measurement signal for mutual capacitance measurement in some cases.

In FIG. 4A, a voltage Vcathode at the ground plate 330 of FIG. 3 is shown. Because the ground plate 330 is coupled to the ground 331, it ideally has a value of substantially 0. However, when the electrodes 311 and 312 are placed close to the ground plate 330 as illustrated in FIG. 3, the measurement signals 401 and 402 applied to the electrodes 311 and 312 may affect the ground plate 330. For example, positive spike voltages 411 and 413 may be generated in the ground plate 330 in rising periods of the measurement signals 401 and 402, and negative spike voltages 412 and 414 may be generated in the ground plate 330 in falling periods of the measurement signals 401 and 402.

In FIG. 4A, the horizontal line update signal h[n] applied to the gate of transistor 385 of FIG. 3 is shown. Based on application of horizontal line update signals 421, 422, and 423, display update may be performed. The spike voltages 411, 412, 413, and 414 at the ground plate 330 may affect both-end voltages of the diodes 352, 353, and 354, which may be observed as flicker or screen flicker. For example, the voltage Vcathode at the ground plate 330 may be changed regularly (e.g., according to the periods of the measurement signals 401 and 402), and the regular change may be observed as a flicker by the user.

FIG. 4B illustrates measurement signals based on a plurality of phases according to various embodiments.

Referring to the left side of FIG. 4B, measurement signals 431, 432, 433, and 434 may be applied to target electrodes to be measured, as in FIG. 4A. The measurement signals 431, 432, 433, and 434 may all have the same phase, for example, a first phase. As illustrated in FIG. 4B, the first phase may be denoted by a number "1". As the measurement signals 431, 432, 433, and 434 having the same phase (e.g., the first phase) are applied to the electrodes, spike voltages 441, 442, 443, 444, 445, 446, 447, and 448 may be generated at the voltage Vcathode(GND) at the ground plate 330. As the measurement signals 431, 432, 433, and 434 having the same phase are provided in every certain period, the spike voltages 441, 442, 443, 444, 445, 446, 447, and 448 may also be generated in every certain period. As a result, voltage fluctuations may also regularly occur at the diodes (e.g., AMOLEDs), causing flicker or screen flicker.

The touch sensor IC 253 according to various embodiments may apply measurement signals 451, 452, 453, and 454 having a plurality of phases to the target electrodes to be measured, as illustrated in the right side of FIG. 4B. For example, the touch sensor IC 253 may apply the measurement signal 451 having the first phase and then the measurement signal 452 having a second phase. Subsequently, the touch sensor IC 253 may alternately apply the measurement signal 453 having the first phase and the measurement signal 454 having the second phase. As illustrated in FIG. 4B, the second phase may be denoted by a number "−1". For example, the touch sensor IC 253 may generate and apply measurement signals in the form of (1, −1, 1, −1, 1, −1). As the measurement signals 451, 452, 453, and 454 based on a plurality of phases are provided, spike voltages 461, 462, 463, 464, 465, 466, 467, and 468 may occur. Compared to the spike voltage 441, 442, 443, 444, 445, 446, 447, and 448 on the left side of FIG. 4B, it may be noted that the spike voltages 461, 462, 463, 464, 465, 466, 467, and 468 on the right side are irregular. Accordingly, more irregular voltage fluctuations may occur in the diodes (e.g., AMOLEDs). The user may perceive regular fluctuations as flicker or screen flicker. The lowering of the regularity of voltage fluctuations in the diodes may alleviate the flicker or the screen flicker perceived by the user.

While it has been described in the above example that the touch sensor IC 253 applies measurement signals based on two phases, this is an example, and those skilled in the art will understand that the touch sensor IC 253 may also apply measurement signals based on three or more phases.

When measurement signals based on a plurality of phases are used, frequency characteristic are likely to be deteriorated with respect to external noise.

Figure 4C:
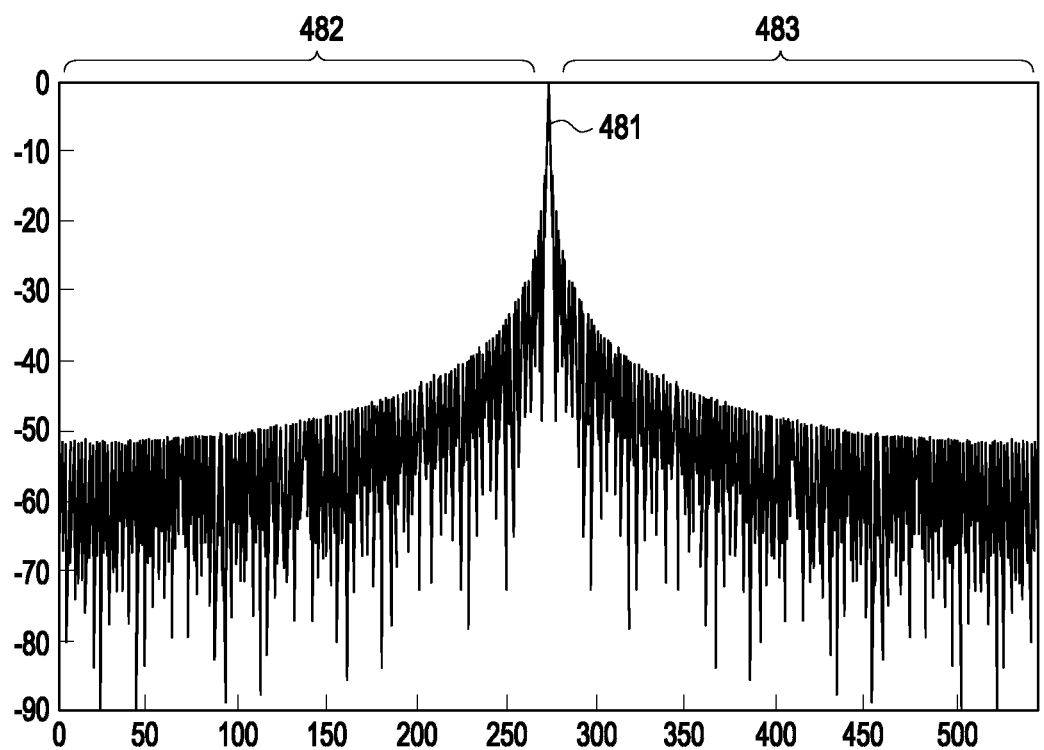
FIGS. 4C and 4D are graphs illustrating a gain for each frequency in the case of measurement signals based on a single phase and in the case of measurement signals based on a plurality of phases according to various embodiments.
Figure 4D:
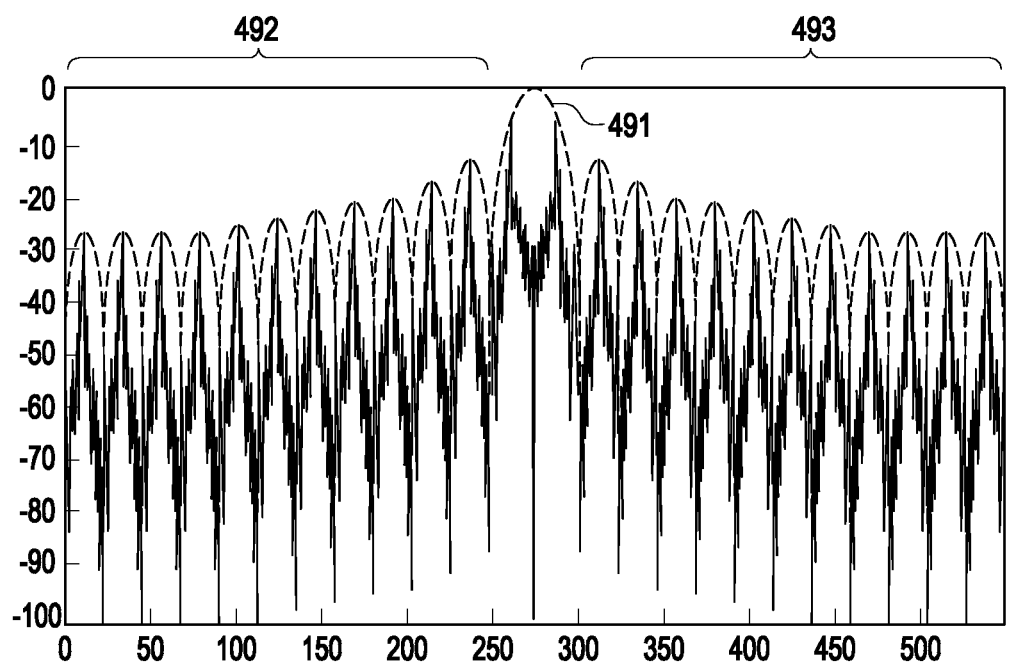

FIGS. 4C and 4D are graphs illustrating a gain for each frequency in the case of measurement signals based on a single phase and in the case of measurement signals based on a plurality of phases according to various embodiments.

In various embodiments, the touch sensor IC 253 may provide measurement signals having a single phase, as illustrated the left side of FIG. 4B. The measurement signals having the single phase may ideally have a single frequency. However, as the measurement signals are provided for a finite time, a certain level of gain may be generated even at frequencies other than the single frequency. For example, referring to FIG. 4C, the gain is highest in a center frequency band 481 (e.g., 275 kHz) and relatively low in adjacent frequency bands 482 and 483. The relatively low gain characteristic in the adjacent frequency bands 482 and 483 may refer, for example, to robustness against external noise. Further, it may be noted that the center frequency band 481 has a large gain and a small bandwidth.

In various embodiments, the touch sensor IC 253 may alternately provide measurement signals having a plurality of phases, for example, a measurement signal having the first phase and a measurement signal having the second phase, as illustrated in the right side of FIG. 4B. In this case, referring to FIG. 4D, although the gain is highest in a center frequency band 491 (e.g., 275 kHz), the gain may be higher in adjacent frequency bands 492 and 493 than in the adjacent frequency bands 482 and 483 in the case of a single phase. Due to relatively high gain characteristics in the adjacent frequency bands 482 and 483, vulnerability to external noise may be higher than in the single-phase case. Accordingly, a malfunction may occur in an environment with noise included in the adjacent frequency bands 492 and 493. Accordingly, the touch sensor IC 253 should provide the touch sensor 251 with measurement signals that maintain gains in adjacent frequency bands at or below a specified value, while having irregularities that make it difficult for the user to observe flicker.

Figure 5:
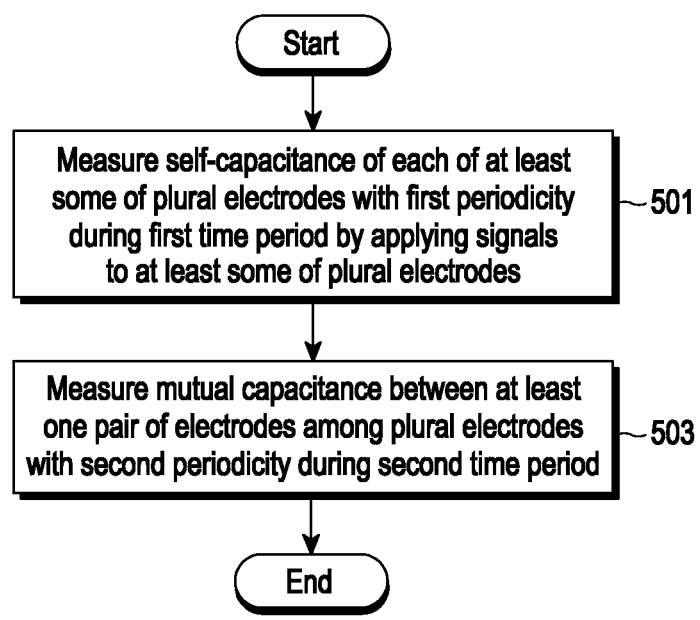
FIG. 5 is a flowchart illustrating an example method of operating an electronic device according to various embodiments.
Figure 6A:
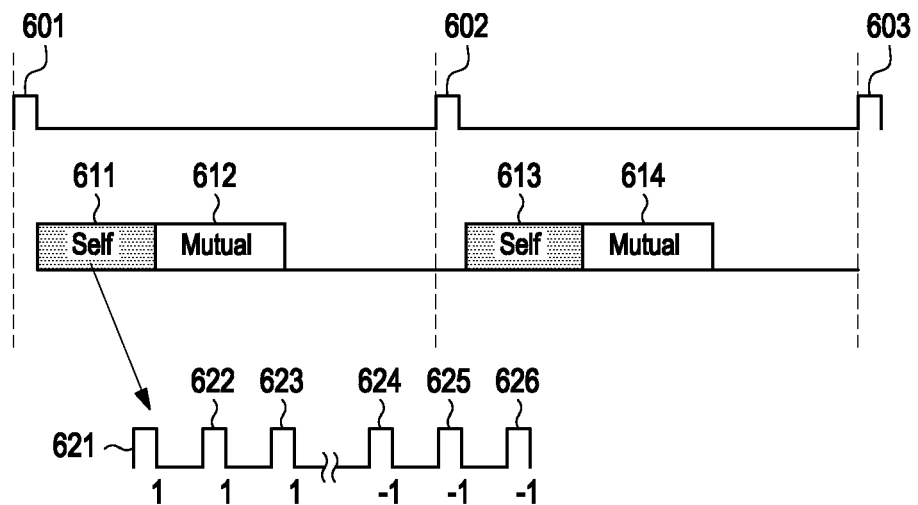
FIG. 6A illustrates an example display driving signal and an input position measurement period according to various embodiments.

FIG. 5 is a flowchart illustrating an example method of operating an electronic device according to various embodiments. The embodiment of FIG. 5 will be described with reference to FIG. 6A. FIG. 6A illustrates a display driving signal and an input position measurement period according to various embodiments.

According to various embodiments, the electronic device 101 (e.g., the touch sensor IC 253) may apply signals to at least some of a plurality of electrodes in the touch sensor 251 to measure the self-capacitance of each of the at least some of the plurality of electrodes with a first periodicity during a first time period in operation 501. In operation 503, the electronic device 101 may measure mutual capacitance between at least one pair of electrodes among the plurality of electrodes with a second periodicity during a second time period. For example, referring to FIG. 6A, the DDI 230 may provide vertical synchronization signals Vsync 601, 602, and 603. While not shown, the DDI 230 may provide a horizontal synchronization signal Hsync (not shown) and data for screen display after providing the vertical synchronization signals 601, 602, and 603. Based on the horizontal synchronization signal and the data, the display 210 may perform display update on a line by line basis. In various examples, the horizontal synchronization signal may be synchronized with mutual capacitance measurement signals 612 and 614, whereas the horizontal synchronization signal may not be synchronized with self-capacitance measurement signals 611 and 613. However, according to some examples, the horizontal synchronization signal may be synchronized not with the mutual capacitance measurement signals 612 and 614 but with the self-capacitance measurement signals 611 and 613. In various embodiments, the DDI 230 may be driven to provide a signal for display update during a certain period after providing the vertical synchronization signal 601, and have an idle period until the next vertical synchronization signal 602. However, this is an example, and the DDI 230 may provide a signal for display update without the idle period between the vertical synchronization signals.

According to various embodiments, the touch sensor IC 253 may perform the self-capacitance measurement 611 and the mutual capacitance measurement 612 after receiving the vertical synchronization signal 601, and perform the self-capacitance measurement 613 and the mutual capacitance measurement 614 after receiving the vertical synchronization signal 602. For example, measurement signals for measuring an input position may be synchronized with at least one of a vertical synchronization signal or a horizontal synchronization signal. The self-capacitance measurements 611 and 613 or the mutual capacitance measurements 612 and 614 may include a process of applying a measurement signal to an electrode and receiving a signal from the electrode or another electrode, and a period during which a measurement signal is applied to an electrode may also be referred to as a measurement period. For example, the electronic device 101 may perform the self-capacitance measurement 611 by applying a plurality of measurement signals 621, 622, 623, 624, 625, and 626 to a target electrode to be measured and measuring a signal output from the target electrode to be measured. For example, the electronic device 101 may perform the mutual capacitance measurement 612 by applying a measurement signal to at least one TX electrode and measuring a signal output from at least one RX electrode. According to various embodiments, a measurement period (or frequency) for each electrode in the self-capacitance measurement 611 may be set to be different from a measurement period (or frequency) for each electrode in the mutual capacitance measurement 612. This may make the other measurement result robust to noise, when the measurement quality of any one measurement result is deteriorated due to noise. For example, a measurement period for each electrode of the mutual capacitance measurement 612 may be synchronized with a period of the horizontal synchronization signal. The touch sensor IC 253 may reduce the influence between input position measurement and screen display by performing the mutual capacitance measurement after a predetermined time from the time of providing the horizontal synchronization signal.

According to various embodiments, the touch sensor IC 253 may provide the measurement signals 621, 622, and 623 having a first phase (e.g., a phase represented by "1") and then the measurement signals 624, 625, and 626 having a second phase (e.g., a phase represented by "4"), as illustrated in FIG. 6A. In this case, spike voltages may be irregularly generated at the ground plate 330 by the measurement signals 621, 622, 623, 624, 625 and 626, and thus the possibility of recognizing flicker may be reduced. This may refer, for example, to the case in which a plurality of measurement signals having the first phase and then a plurality of measurement signals having the second phase are provided as illustrated in FIG. 6A is more robust against noise than the case of alternately providing a plurality of measurement signals having the first phase and the second phase.

The phase combination of (1, 1, 1, . . . , −1, −1, −1) as illustrated in FIG. 6A is also merely an example, and those skilled in the art will understand that as far as they have a combination of phases which lead to gains equal to or lower than a specified level in adjacent frequency bands, any measurement signals may be used.

According to various embodiments, the touch sensor IC 253 may also provide measurement signals corresponding to a phase combination of (1, 1, 1, . . . , −1, −1, −1) even during the self-capacitance measurement 613. During the self-capacitance measurement 613, the touch sensor IC 253 may provide measurement signals corresponding to a different phase combination from that of the self-capacitance measurement 611. While it is illustrated in FIG. 6A that self-capacitance measurement and mutual capacitance measurement are performed once in response to one vertical synchronization signal, this is an example. The touch sensor IC 253 according to various embodiments may also perform self-capacitance measurement two or more times and mutual capacitance measurement two more times in response to one vertical synchronization signal. The duration of self-capacitance measurement and the duration of mutual capacitance measurement may be adjusted by the touch sensor IC 253. According to various embodiments, after one vertical synchronization signal 601, self-capacitance measurement may be performed once or two or more times, or after the next vertical synchronization signal 601, mutual capacitance measurement may be performed once or two or more times. For example, the electronic device 101 may alternate between self-capacitance measurement and mutual capacitance measurement based on application of the vertical synchronization signal 601.

Figure 6B:
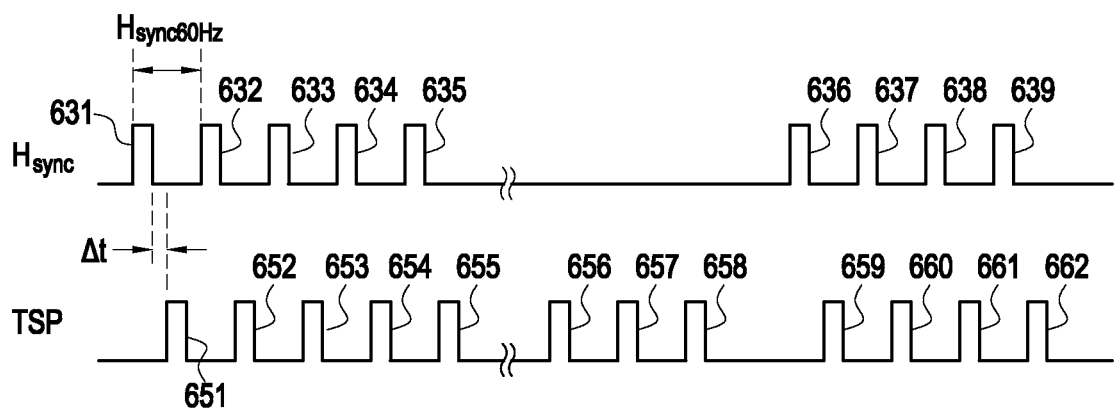
FIG. 6B illustrates an example process of measuring mutual capacitance according to various embodiments.

FIG. 6B illustrates a process of measuring mutual capacitance according to various embodiments.

According to various embodiments, the DDI 230 may provide horizontal synchronization signals Hsync 631, 632, 633, 634, 635, 636, 637, 638, and 639 with a periodicity of Hsync60 Hz. The periodicity of Hsync60 Hz may refer, for example, to the periodicity of a horizontal synchronization signal, being smaller than ($\frac{1}{60}$ Hz)s, when the periodicity of the vertical synchronization signal is ($\frac{1}{60}$ Hz)s. When the periodicity of the vertical synchronization signal is changed to ($\frac{1}{120}$ Hz)s, the periodicity of the horizontal synchronization signal may also be adjusted to Hsync120 Hz. The periodicity of Hsync120 Hz may be smaller than the periodicity of Hsync60 Hz.

According to various embodiments, the display 210 may display one image frame, for example, based on reception of a vertical synchronization signal (e.g., the vertical synchronization signal 601). The display 210 may perform each horizontal line update, for example, based on horizontal synchronization signals 631, 632, 633, 634, and 635. In the embodiment of FIG. 6B, it is illustrated that after the vertical synchronization signal (e.g., the vertical synchronization signal 601) is provided, the horizontal synchronization signals 631, 632, 633, 634, and 635 are provided during a certain time, and then no other horizontal synchronization signal is applied until the next vertical synchronization signal (e.g., the vertical synchronization signal 602) is provided. While the display update may be performed for a relatively short time, instead of the total period from the vertical synchronization signal (e.g., the vertical synchronization signal 601) to the next vertical synchronization signal (e.g., the vertical synchronization signal 602), it will be understood by those skilled in the art that various embodiments are not limited thereto. For example, the DDI 230 may be configured to provide the vertical synchronization signal (e.g., the vertical synchronization signal 601), and then provide a horizontal synchronization signal without an idle period until before providing the next vertical synchronization signal (e.g., the vertical synchronization signal 602).

The touch sensor IC 253 according to various embodiments may obtain information about an input position on the touch sensor 251. In the disclosure, when it is said that the touch sensor IC 253 senses an input position, this may refer, for example, to the touch sensor IC 253 measuring mutual capacitance (or a change in the mutual capacitance) between at least one electrode and another electrode included in the touch sensor 251. For example, the touch sensor IC 253 may apply a signal to at least one transmitting (TX) electrode included in the touch sensor 251, measure a signal from at least one receiving (RX) electrode, and process a measurement result to obtain information about an input position on the touch sensor IC 253. The above-described mutual capacitance measurement method is merely an example, and the measurement method is not limited. When the touch sensor IC 253 senses an input position, this may refer, for example, to the touch sensor IC 253 measuring the self-capacitance (or a change in the self-capacitance) of at least one electrode included in the touch sensor 251. The touch sensor IC 253 may measure the self-capacitance of at least one electrode in the touch sensor 251 by providing a signal to the at least one electrode included in the touch sensor 251, and identify charges accumulated in a capacitor corresponding to the electrode. The above-described self-capacitance measurement method is merely an example, and the measurement method is not limited.

The touch sensor IC 253 according to various embodiments may be configured to sense, for example, mutual capacitance, avoiding a time period during which a horizontal line update is performed. For example, the touch sensor IC 253 may set the timings of applying signals 651, 652, 653, 654, 655, 659, 660, 463, and 662 to at least one electrode included in the touch sensor 251 to be apart from the time timings of applying horizontal synchronization signals 631, 632, 633, 634, 635, 636, 637, 638, and 639 by a predetermined time interval Δt. The signals 651, 652, 653, 654, 655, 659, 660, 463, and 662 provided to the at least one electrode included in the touch sensor 251 may be, for example, signals to measure mutual capacitance associated with the at least one electrode. For example, the touch sensor IC 251 may set the timings of applying the signals 651, 652, 653, 654, 655, 659, 660, 463, and 662 to measure the mutual capacitance so as not to overlap with a horizontal line update time (or so that the overlapping time is less than or equal to a specified time). For example, the touch sensor IC 251 may set the application period of the signals 651, 652, 653, 654, 655, 659, 660, 463, and 662 to be equal to the application period of the horizontal synchronization signal. The touch sensor IC 251 may synchronize the timing of applying a signal to the electrode with the application timing of the display driving signal, wherein the synchronization may refer, for example, to the period of the horizontal synchronization signal and the application period of the signal to the electrode being set to be equal, with a predetermined time interval Δt between application time points. The synchronization of the mutual capacitance measurement period and the display driving signal is merely an example, and according to various embodiments, the self-capacitance measurement period and the display driving signal may be configured to be synchronized. As described above, since the measurement of an input position may refer, for example, to application of a signal to and reception of a signal from an electrode, the signals 651, 652, 653, 654, 655, 659, 660, 663, and 662 may be referred to as an input position measurement period in some cases. While it has been described above that the signals to measure mutual capacitance are synchronized with the horizontal synchronization signal, this is merely an example, and the signals to measure self-capacitance may be synchronized with the horizontal synchronization signal, as described above.

According to various embodiments, the touch sensor IC 253 may apply signals 656, 657, and 658 even during an idle period in which a horizontal synchronization signal is not applied, as illustrated in FIG. 6B. Then, the touch sensor IC 253 may apply signals 659, 660, 661, and 662 not to overlap with the horizontal synchronization signals 636, 637, 638 and 639. The touch sensor IC 253 may obtain information about the input position based on a signal applied to and a signal output from the at least one electrode. When all nodes are completely measured, one frame of input position information may be obtained. The touch sensor IC 253 may obtain n frames of input position information, for example, between vertical synchronization signals, and the number of times input position information is obtained is not limited and may be changed. The number of input position measurements will be described later. In various embodiments, a frequency for measuring mutual capacitance may be set to be different from a frequency for measuring self-capacitance.

Figure 7:
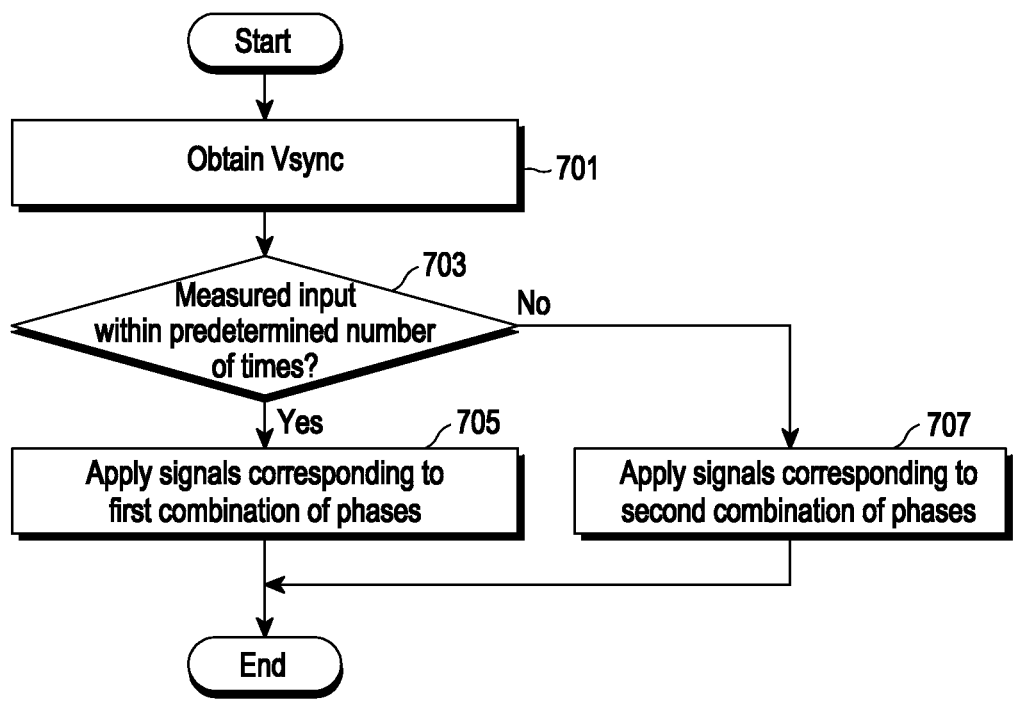
FIG. 7 is a flowchart illustrating an example method of operating an electronic device according to various embodiments.
Figure 8:
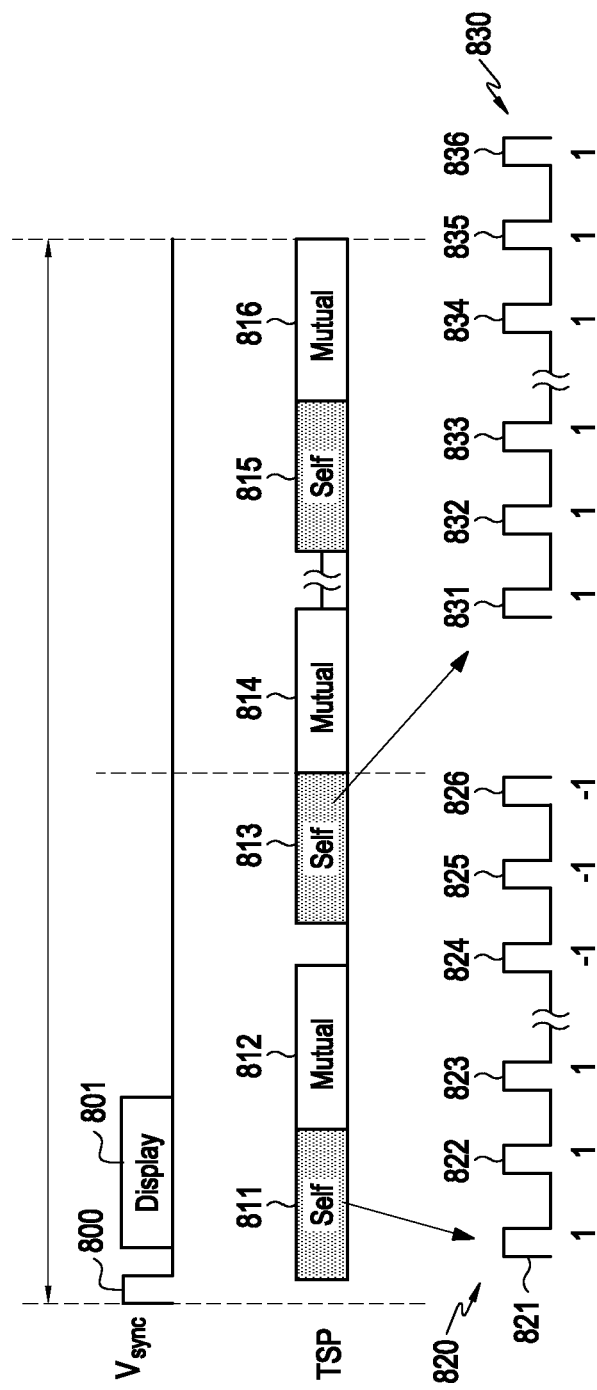
FIG. 8 illustrates an example display driving signal and an input position measurement period according to various embodiments.

FIG. 7 is a flowchart illustrating an example method of operating an electronic device according to various embodiments. The embodiment of FIG. 7 will be described with reference to FIG. 8. FIG. 8 illustrates a display driving signal and an input position measurement period according to various embodiments.

According to various embodiments, the electronic device 101 (e.g., the touch sensor IC 253) may obtain a vertical synchronization signal in operation 701. For example, as illustrated in FIG. 8, the touch sensor IC 253 may obtain a vertical synchronization signal 800. The DDI 230 may provide the vertical synchronization signal 800 and perform display update 801. The touch sensor IC 253 may perform a plurality of input position measurements in response to one vertical synchronization signal. For example, as illustrated in FIG. 8, the touch sensor IC 253 may be configured to perform a plurality of self-capacitance measurements 811, 813, and 815, and a plurality of mutual capacitance measurements 812, 814, and 816 in response to the single vertical synchronization signal 800.

According to various embodiments, in operation 703, the touch sensor IC 253 may determine whether a corresponding input position measurement is within a predetermined number of times. When the input position measurement is within the predetermined number of times (703—Yes), the electronic device 101 may apply signals corresponding to a first combination of phases to electrodes in operation 705. When the corresponding input position measurement is not within the predetermined number of times (703—No), the electronic device 101 may apply signals corresponding to a second combination of phases to the electrodes in operation 707. For example, in the self-capacitance measurement 811, the touch sensor IC 253 may apply measurement signals 821, 822, 823, 824, 825, and 826 having a first combination 820 of phases (e.g., (1, 1, 1, . . . , −1, −1, −1)) to the electrodes. For example, the touch sensor IC 253 may apply signals 831, 832, 833, 834, 835, and 836 having a second combination 830 of phases (e.g., (1, 1, 1, . . . , 1, 1, 1)) to the electrodes in the self-capacitance measurements 813 and 815. After the display update 801 is completed, there is no possibility that the measurement signals affect the display update. Accordingly, the touch sensor IC 253 may apply the measurement signals 821, 822, 823, 824, 825, and 826 having the first combination 820 of phases that alleviate flicker to the electrodes during the self-capacitance measurement 811 in a period that may affect the display update. During the self-capacitance measurements 813 and 815 in a period that does not affect the display update, the touch sensor IC 253 may apply the measurement signals 831, 832, 833, 834, 835, and 836 having the second combination 830 of phases that is robust against noise to the electrodes. The predetermined number may be set to the number of measurements that may affect display update, and when self-capacitance measurement periods are changed, the predetermined number may also be changed. In an embodiment, the touch sensor IC 253 may provide measurement signals of the same phase combination, when performing a plurality of input position measurements on one vertical synchronization signal.

Figure 9A:
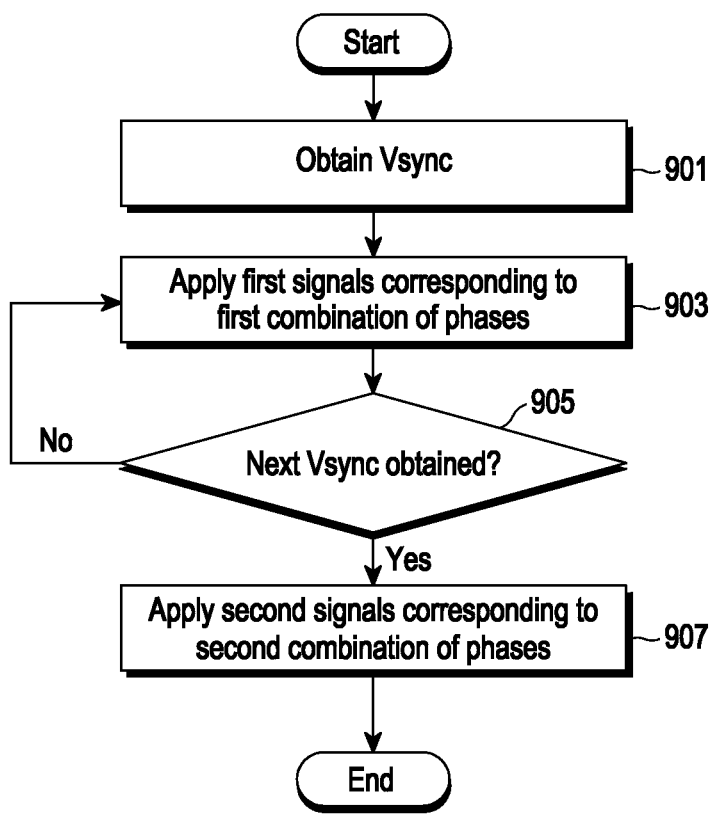
FIG. 9A is a flowchart illustrating an example method of operating an electronic device according to various embodiments.
Figure 9B:
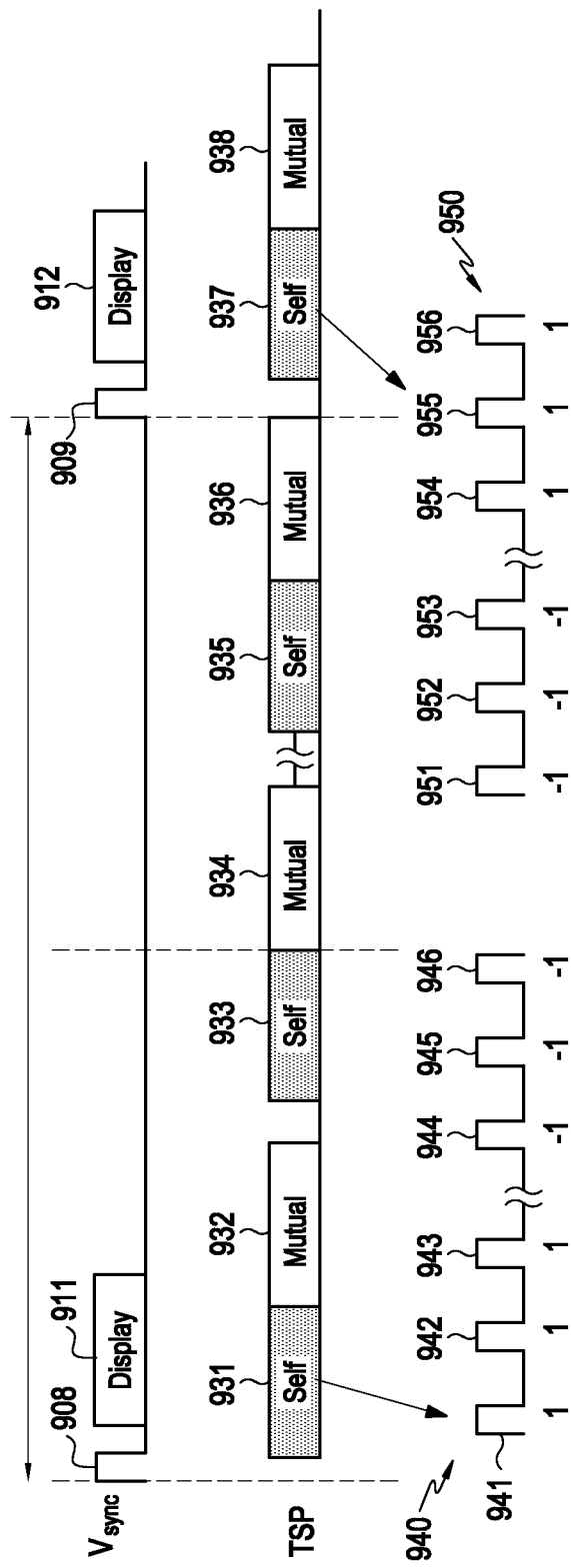
FIG. 9B illustrates an example display driving signal and an input position measurement period according to various embodiments.

FIG. 9A is a flowchart illustrating an example method of operating an electronic device according to various embodiments. The embodiment of FIG. 9A will be described with reference to FIG. 9B. FIG. 9B illustrates a display driving signal and an input position measurement period according to various embodiments.

According to various embodiments, the electronic device 101 (e.g., the touch sensor IC 253) may obtain a vertical synchronization signal in operation 901. In operation 903, the touch sensor IC 253 may apply first signals corresponding to a first combination of phases. For example, as in FIG. 9B, the touch sensor IC 253 may obtain a vertical synchronization signal 908. The DDI 230 may provide the vertical synchronization signal 908 and perform display update 911. The DDI 230 may provide a vertical synchronization signal 909 and perform display update 912. The touch sensor IC 253 may perform a plurality of input position measurements in response to one vertical synchronization signal. For example, as illustrated in FIG. 9B, the touch sensor IC 253 may perform a plurality of self-capacitance measurements 931, 933, and 935, and a plurality of mutual capacitance measurements 932, 934, and 936 in response to the single vertical synchronization signal 908. In addition, the touch sensor IC 253 may perform a self-capacitance measurement 937 and a mutual capacitance measurement 938 in response to the vertical synchronization signal 908. While not shown, the touch sensor IC 253 may then perform self-capacitance measurement a plurality of times and mutual capacitance measurement a plurality of times.

According to various embodiments, the touch sensor IC 253 may determine whether the next vertical synchronization signal is obtained in operation 905. When the next vertical synchronization signal is not obtained (905—NO), the touch sensor IC 253 may apply the first signals corresponding to the first combination of phases. When the next vertical synchronization signal is obtained (905—Yes), the touch sensor IC 253 may apply second signals corresponding to a second combination of phases in operation 907. For example, as in FIG. 9B, in the self-capacitance measurement 311, the touch sensor IC 253 may apply measurement signals 941, 942, 943, 944, 945, and 946 having a first combination 940 of phases (e.g., (1, 1, 1, . . . , −1, −1, −1)) to the electrodes. For example, in the self-capacitance measurement 937 after the next vertical synchronization signal 909 is acquired, the touch sensor IC 253 may apply measurement signals 951, 952, 953, 954, 955, and 956 having a second combination 950 of phases (e.g., −1, −1, −1, . . . , 1, 1, 1)) to the electrodes. For example, when the period (e.g., 1/(1 Hz)s) of the vertical synchronization signal is longer than the driving period (e.g., 1/(120 Hz)s) of the touch sensor IC 253, the operations of FIG. 9A may be performed. However, there are no restrictions on the condition. As the different combinations 940 and 950 are used for the respective vertical synchronization signals, irregularity may be further increased, and thus the possibility of occurrence of flicker may be lowered. The self-capacitance measurements 931, 933, and 935 within the period of one vertical synchronization signal may have the same phase combination or different phase combinations as in FIG. 8.

Figure 9C:
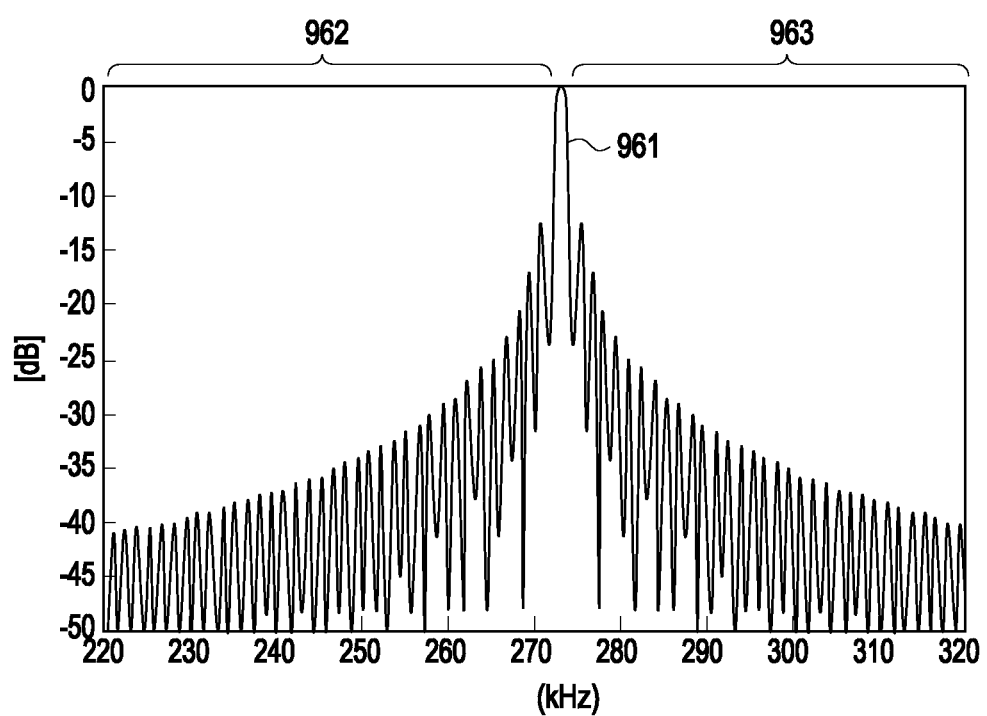
FIG. 9C is a graph illustrating a gain for each frequency according to FIG. 9B according to various embodiments.

FIG. 9C is a graph illustrating a gain for each frequency according to FIG. 9B. As illustrated in FIG. 9C, a gain of −3 dB is identified in a center frequency band 961, and relatively low gains are identified in adjacent frequency bands 962 and 963. Accordingly, while the occurrence of flicker is alleviated, an input position may be measured with robustness against ambient noise.

Figure 10:
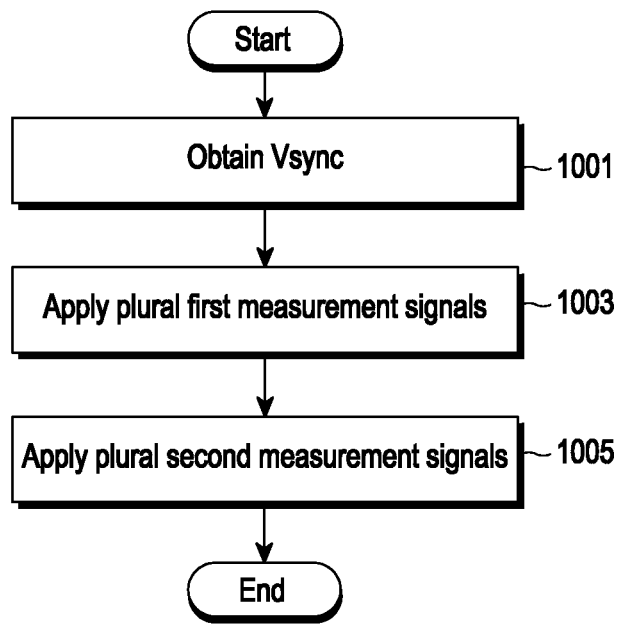
FIG. 10 is a flowchart illustrating an example method of operating an electronic device according to various embodiments.

FIG. 10 is a flowchart illustrating an example method of operating an electronic device according to various embodiments.

According to various embodiments, the electronic device 101 (e.g., the touch sensor IC 253) may obtain a vertical synchronization signal in operation 1001. For example, the DDI 230 may provide the vertical synchronization signal and perform display update. After providing the vertical synchronization signal, the DDI 230 may provide a plurality of horizontal synchronization signals, and provide data for the display update based on the horizontal synchronization signals to the display 210.

According to various embodiments, the touch sensor IC 253 may apply a plurality of first measurement signals in response to the vertical synchronization signal in operation 1003. After applying the plurality of first measurement signals, the touch sensor IC 253 may apply second measurement signals in operation 1005. For example, the touch sensor IC 253 may apply the plurality of first measurement signals and/or the plurality of second measurement signals with a first periodicity, and at least some of the application periods of the first measurement signals and/or the plurality of second measurement signals may overlap with at least part of the horizontal synchronization signal. As described above, the electronic device 101 may perform self-capacitance measurement or mutual capacitance measurement that is not synchronized with the horizontal synchronization signal, and the plurality of first measurement signals and/or the plurality of second measurement signals may not be synchronized with the horizontal synchronization signal. As described with reference to FIG. 6A, the touch sensor IC 253 may apply a plurality of first measurement signals having a first phase, and then apply a plurality of second measurement signals having a second phase. Accordingly, an input position may be measured with robustness against external noise, while flicker is alleviated.

According to various example embodiments, the electronic device (e.g., the electronic device 101) may include: a display (e.g., the display 210), a display driving integrated circuit (IC) (e.g., the DDI 230) configured to apply at least one driving signal to the display (e.g., the display 210), a touch sensor (e.g., the touch sensor 251) including a plurality of electrodes, and a touch sensor IC (e.g., the touch sensor IC 253) configured to identify an input position on the touch sensor (e.g., the touch sensor 251). The touch sensor IC (e.g., the touch sensor IC 253) may be configured to: obtain a first vertical synchronization signal among the at least one driving signal from the display driving IC (e.g., the DDI 230), based on the first vertical synchronization signal being obtained, provide a plurality of first measurement signals corresponding to a first phase to at least some first electrodes of the plurality of electrodes with a first periodicity, and provide a plurality of second measurement signals corresponding to a second phase different from the first phase to at least some second electrodes of the plurality of electrodes with the first periodicity, after providing the plurality of first measurement signals. At least some of application periods of the plurality of first driving signals and the plurality of second driving signals may overlap with at least part of an application period of the at least one driving signal.

According to various example embodiments, the touch sensor IC (e.g., the touch sensor IC 253) may further be configured to measure self-capacitance corresponding to the at least some first electrodes, based on a signal output from the at least some first electrodes to which the plurality of first measurement signals are applied, and measure self-capacitance corresponding to the at least some second electrodes, based on a signal output from the at least some second electrodes to which the plurality of second measurement signals are applied.

According to various example embodiments, the touch sensor IC (e.g., the touch sensor IC 253) may further be configured to measure mutual capacitance between at least one pair of electrodes among the plurality of electrodes, after measuring the self-capacitance corresponding to the at least some first electrodes and the self-capacitance corresponding to the at least some second electrodes. The measuring of the mutual capacitance may include applying a plurality of third measurement signals for the measurement of the mutual capacitance, and application periods of the plurality of third measurement signals may not overlap with the application period of the at least one driving signal.

According to various example embodiments, the touch sensor IC (e.g., the touch sensor IC 253) may be configured to perform measurement of the self-capacitance corresponding to the at least some first electrodes and the self-capacitance corresponding to the at least some second electrodes once before a second vertical synchronization signal is received after the first vertical synchronization signal, as at least part of the measuring of the self-capacitance corresponding to the at least some first electrodes and the self-capacitance corresponding to the at least some second electrodes.

According to various example embodiments, the touch sensor IC (e.g., the touch sensor IC 253) may be configured to perform measurement of the self-capacitance corresponding to the at least some first electrodes and the self-capacitance corresponding to the at least some second electrodes a plurality of times before a second vertical synchronization signal is received after the first vertical synchronization signal, as at least part of the measuring of the self-capacitance corresponding to the at least some first electrodes and the self-capacitance corresponding to the at least some second electrodes.

According to various example embodiments, the touch sensor IC (e.g., the touch sensor IC 253) may be configured to repeat application of the plurality of first measurement signals and the plurality of second measurement signals after providing the plurality of first measurement signals and the plurality of second measurement signals, as at least part of the performing measurement of the self-capacitance corresponding to the at least some first electrodes and the self-capacitance corresponding to the at least some second electrodes the plurality of times.

According to various example embodiments, the touch sensor IC (e.g., the touch sensor IC 253) may be configured to apply a plurality of measurement signals having a different phase combination from a phase combination of the plurality of first measurement signals and the plurality of second measurement signals after repeatedly providing the plurality of first measurement signals and the plurality of second measurement signals a specified number of times, as at least part of the performing measurement of the self-capacitance corresponding to the at least some first electrodes and the self-capacitance corresponding to the at least some second electrodes the plurality of times.

According to various example embodiments, the specified number may correspond to a period during which the display driving IC outputs a signal for performing display update.

According to various example embodiments, the touch sensor IC (e.g., the touch sensor IC 253) may further be configured to, after receiving a second vertical synchronization signal following the first synchronization signal, measure self-capacitance corresponding to the at least some first electrodes and self-capacitance corresponding to the at least some second electrodes after the second vertical synchronization signal by applying the plurality of second measurement signals corresponding to the second phase after applying the plurality of first measurement signals corresponding to the first phase.

According to various example embodiments, the touch sensor IC (e.g., the touch sensor IC 253) may further be configured to, after receiving a second vertical synchronization signal following the first synchronization signal, measure self-capacitance corresponding to the at least some first electrodes and self-capacitance corresponding to the at least some second electrodes after the second vertical synchronization signal by applying a plurality of measurement signals corresponding to a different phase combination from a phase combination of the plurality of first measurement signals and the plurality of second measurement signals.

According to various example embodiments, the touch sensor IC (e.g., the touch sensor IC 253) may further be configured to measure mutual capacitance associated with a plurality of first reception electrodes based on a signal output from the plurality of first reception electrodes corresponding to the at least some first electrodes to which the plurality of first measurement signals are applied, and measure mutual capacitance associated with a plurality of second reception electrodes based on a signal output from the plurality of second reception electrodes corresponding to the at least some second electrodes to which the plurality of second measurement signals are applied.

According to various example embodiments, the electronic device (e.g., the electronic device 101) may include: a display (e.g., the display 210), a display driving integrated circuit (IC0 (e.g., the DDI 230) configured to apply at least one driving signal to the display (e.g., the display 210), a touch sensor (e.g., the touch sensor 251) including a plurality of electrodes, and a touch sensor IC (e.g., the touch sensor IC 253) configured to identify an input position on the touch sensor screen panel. The touch sensor IC (e.g., the touch sensor IC 253) may be configured to: measure first self-capacitance of each of at least some of the plurality of electrodes by applying first measurement signals corresponding to a first combination of phases to the at least some of the plurality of electrodes, and measure second self-capacitance of each of at least some of the plurality of electrodes by applying second signals corresponding to a second combination of phases to the at least some of the plurality of electrodes, after the first self-capacitance is measured by applying the first signals.

According to various example embodiments, the touch sensor IC (e.g., the touch sensor IC 253) may configured to apply the first measurement signals, based on reception of a first vertical synchronization signal from the display driving IC (e.g., the DDI 230), as at least part of the applying of the first measurement signals corresponding to the first combination of phases, and apply the second measurement signals, based on reception of a second vertical synchronization signal from the display driving IC (e.g., the DDI 230), as at least part of the applying of the second measurement signals corresponding to the second combination of phases.

According to various example embodiments, the display driving IC (e.g., the DDI 230) may be configured, before providing the second vertical synchronization signal after providing the first vertical synchronization signal, to provide at least one signal for display update to the display during a first sub-period, and refrain from outputting a signal during a second sub-period after the first sub-period.

According to various example embodiments, the touch sensor IC (e.g., the touch sensor IC 253) may configured to: perform measurement of self-capacitance a plurality of times before receiving the second vertical synchronization signal by repeating application of the first measurement signals, based on the reception of the first vertical synchronization signal from the display driving IC (e.g., the DDI 230), as at least part of the applying of the first measurement signals corresponding to the first combination of phases, and perform measurement of self-capacitance a plurality of times after receiving the second vertical synchronization signal by repeating application of the second measurement signals, based on the reception of the second vertical synchronization signal from the display driving IC (e.g., the DDI 230), as at least part of the applying of the second measurement signals corresponding to the second combination of phases.

According to various example embodiments, the touch sensor IC (e.g., the touch sensor IC 253) may configured to repeat application of the first measurement signals a specified number of times, based on the reception of the first vertical synchronization signal from the display driving IC (e.g., the DDI 230), and apply measurement signals having a different combination of phases from the combination of phases of the first measurement signals until before receiving the second vertical synchronization signal, as at least part of the applying of the first measurement signals corresponding to the first combination of phases, and repeat application of the second measurement signals the specified number of times, based on the reception of the second vertical synchronization signal from the display driving IC (e.g., the DDI 230), and apply measurement signals having a different combination of phases from the combination of phases of the second measurement signals until before receiving a third vertical synchronization signal after the second vertical synchronization signal, as at least part of the applying of the second measurement signals corresponding to the second combination of phases.

According to various example embodiments, the specified number may correspond to a period during which the display driving IC outputs a signal for display update.

According to various example embodiments, the touch sensor IC (e.g., the touch sensor IC 253) may configured to apply the first measurement signals based on the reception of the first vertical synchronization signal from the display driving IC, as at least part of the applying of the first measurement signals corresponding to the first combination of phases, and apply the second measurement signals before receiving the second vertical synchronization signal from the display driving IC, as at least part of the applying of the second measurement signals corresponding to the second combination of phases.

According to various example embodiments, a structure of an electronic device may include: a substrate on which a thin-film transistor (TFT) structure for displaying (e.g., the display 210) at least one screen is disposed, an encapsulation layer disposed on the TFT structure, a touch sensor (e.g., the touch sensor 251) disposed on the encapsulation layer and including a plurality of electrodes, and an integrated circuit configured to: identify an input position on the touch sensor (e.g., the touch sensor 251) and provide at least one driving signal to the TFT structure. The integrated circuit may be configured to: provide a plurality of first measurement signals corresponding to a first phase to at least some first electrodes of the plurality of electrodes with a first periodicity, based on a first vertical synchronization signal, and provide a plurality of second measurement signals corresponding to a second phase different from the first phase to at least some second electrodes of the plurality of electrodes with the first periodicity, after providing the plurality of first measurement signals. At least some of application periods of the plurality of first driving signals and the plurality of second driving signals may overlap with at least part of an application period of the at least one driving signal.

According to various example embodiments, the structure may further include a ground plate electrically coupled to the plurality of electrodes and electrically coupled to the TFT structure.

The electronic device according to an embodiment may be one of various types of electronic devices. The electronic devices may include, for example, a computer device, a portable communication device (e.g., a smartphone), a portable multimedia device, a portable medical device, a camera, a wearable device, a home appliance, or the like. According to an embodiment of the disclosure, the electronic devices are not limited to those described above.

It should be appreciated that an embodiment of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

An embodiment of the disclosure as set forth herein may be implemented as software (e.g., a program) including one or more instructions that are stored in a storage medium (e.g., internal memory or external memory) that is readable by a machine (e.g., a master device or a task performing device). For example, a processor of the machine (e.g., the master device or the task performing device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the 'non-transitory' storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. According to an embodiment, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a display;
a display driving integrated circuit (IC) configured to apply at least one driving signal to the display;
a touch sensor including a plurality of electrodes; and
a touch sensor IC configured to identify an input position on the touch sensor,
wherein the touch sensor IC is configured to:
obtain a first vertical synchronization signal among the at least one driving signal from the display driving IC,
based on the first vertical synchronization signal being obtained, provide a plurality of first self-capacitance measurement signals having a first phase to at least some first electrodes of the plurality of electrodes with a first periodicity, and
provide a plurality of second self-capacitance measurement signals having a second phase different from the first phase to at least some second electrodes of the plurality of electrodes with the first periodicity, after providing the plurality of first self-capacitance measurement signals, and
wherein at least some of application periods of the plurality of first driving signals and the plurality of second driving signals overlap with at least part of an application period of the at least one driving signal.

2. The electronic device of claim 1, wherein the touch sensor IC is further configured to:
measure self-capacitance corresponding to the at least some first electrodes, based on a signal output from the at least some first electrodes to which the plurality of first self-capacitance measurement signals are applied, and
measure self-capacitance corresponding to the at least some second electrodes, based on a signal output from the at least some second electrodes to which the plurality of second self-capacitance measurement signals are applied.

3. The electronic device of claim 2, wherein the touch sensor IC is further configured to measure mutual capacitance between at least one pair of electrodes among the plurality of electrodes, after measuring the self-capacitance corresponding to the at least some first electrodes and the self-capacitance corresponding to the at least some second electrodes, and
wherein the measuring of the mutual capacitance includes applying a plurality of first mutual capacitance measurement signals for the measurement of the mutual capacitance, and application periods of the plurality of first mutual capacitance measurement signals do not overlap with the application period of the at least one driving signal.

4. The electronic device of claim 2, wherein the touch sensor IC is further configured to: perform measurement of the self-capacitance corresponding to the at least some first electrodes and the self-capacitance corresponding to the at least some second electrodes once before a second vertical synchronization signal is received after the first vertical synchronization signal, as at least part of the measuring of the self-capacitance corresponding to the at least some first electrodes and the self-capacitance corresponding to the at least some second electrodes.

5. The electronic device of claim 2, wherein the touch sensor IC is further configured to perform measurement of the self-capacitance corresponding to the at least some first electrodes and the self-capacitance corresponding to the at least some second electrodes a plurality of times before a second vertical synchronization signal is received after the first vertical synchronization signal, as at least part of the measuring of the self-capacitance corresponding to the at least some first electrodes and the self-capacitance corresponding to the at least some second electrodes.

6. The electronic device of claim 5, wherein the touch sensor IC is configured to repeat application of the plurality of first self-capacitance measurement signals and the plurality of second self-capacitance measurement signals after providing the plurality of first self-capacitance measurement signals and the plurality of second self-capacitance measurement signals, as at least part of the performing measurement of the self-capacitance corresponding to the at least some first electrodes and the self-capacitance corresponding to the at least some second electrodes the plurality of times.

7. The electronic device of claim 5, wherein the touch sensor IC is configured to apply a plurality of self-capacitance measurement signals having a different phase combination from a phase combination of the plurality of first self-capacitance measurement signals and the plurality of second self-capacitance measurement signals after repeatedly providing the plurality of first self-capacitance measurement signals and the plurality of second self-capacitance measurement signals a specified number of times, as at least part of the performing measurement of the self-capacitance corresponding to the at least some first electrodes and the self-capacitance corresponding to the at least some second electrodes the plurality of times.

8. The electronic device of claim 7, wherein the specified number corresponds to a period during which the display driving IC outputs a signal for performing display update.

9. The electronic device of claim 2, wherein the touch sensor IC is further configured to, after receiving a second vertical synchronization signal following the first synchronization signal, measure self-capacitance corresponding to the at least some first electrodes and self-capacitance corresponding to the at least some second electrodes after the second vertical synchronization signal by applying the plurality of second self-capacitance measurement signals having the second phase after applying the plurality of first self-capacitance measurement signals having the first phase.

10. The electronic device of claim 2, wherein the touch sensor IC is further configured to, after receiving a second vertical synchronization signal following the first synchronization signal, measure self-capacitance corresponding to the at least some first electrodes and self-capacitance corresponding to the at least some second electrodes after the second vertical synchronization signal by applying a plurality of self-capacitance measurement signals corresponding to a different phase combination from a phase combination of the plurality of first self-capacitance measurement signals and the plurality of second self-capacitance measurement signals.

11. The electronic device of claim 1, wherein the touch sensor IC is further configured to:
measure mutual capacitance associated with a plurality of first reception electrodes based on a signal output from the plurality of first reception electrodes corresponding to the at least some first electrodes to which the plurality of first self-capacitance measurement signals are applied, and
measure mutual capacitance associated with a plurality of second reception electrodes based on a signal output from the plurality of second reception electrodes corresponding to the at least some second electrodes to which the plurality of second self-capacitance measurement signals are applied.

12. An electronic device comprising:
a display;
a display driving integrated circuit (IC) configured to apply at least one driving signal to the display;
a touch sensor including a plurality of electrodes; and
a touch sensor IC configured to identify an input position on the touch sensor screen panel,
wherein the touch sensor IC is configured to:
measure first self-capacitance of each of at least some of the plurality of electrodes by applying first self-capacitance measurement signals having a first combination of phases to the at least some of the plurality of electrodes, and
measure second self-capacitance of each of at least some of the plurality of electrodes by applying second self-capacitance measurement signals having a second combination of phases to the at least some of the plurality of electrodes, after the first self-capacitance is measured by applying the first signals.

13. The electronic device of claim 12, wherein the touch sensor IC is configured to:
apply the first self-capacitance measurement signals, based on reception of a first vertical synchronization signal from the display driving IC, as at least part of the applying of the first self-capacitance measurement signals corresponding to the first combination of phases, and
apply the second self-capacitance measurement signals, based on reception of a second vertical synchronization signal from the display driving IC, as at least part of the applying of the second self-capacitance measurement signals corresponding to the second combination of phases.

14. The electronic device of claim 13, wherein the display driving IC is configured, before providing the second vertical synchronization signal after providing the first vertical synchronization signal, to:
provide at least one signal for display update to the display during a first sub-period, and
refrain from outputting a signal for display update during a second sub-period after the first sub-period.

15. The electronic device of claim 13, wherein the touch sensor IC is configured to:
perform measurement of self-capacitance a plurality of times before receiving the second vertical synchronization signal by repeating application of the first self-capacitance measurement signals, based on the reception of the first vertical synchronization signal from the display driving IC, as at least part of the applying of the first self-capacitance measurement signals corresponding to the first combination of phases, and
perform measurement of self-capacitance a plurality of times after receiving the second vertical synchronization signal by repeating application of the second self-capacitance measurement signals, based on the reception of the second vertical synchronization signal from the display driving IC, as at least part of the applying of the second self-capacitance measurement signals corresponding to the second combination of phases.

16. The electronic device of claim 13, wherein the touch sensor IC is configured to:
repeat application of the first self-capacitance measurement signals a specified number of times, based on the reception of the first vertical synchronization signal from the display driving IC, and apply self-capacitance measurement signals having a different combination of phases from the combination of phases of the first self-capacitance measurement signals until before receiving the second vertical synchronization signal, as at least part of the applying of the first self-capacitance measurement signals corresponding to the first combination of phases, and
repeat application of the second self-capacitance measurement signals the specified number of times, based on the reception of the second vertical synchronization signal from the display driving IC, and apply self-capacitance measurement signals having a different combination of phases from the combination of phases of the second self-capacitance measurement signals until before receiving a third vertical synchronization signal after the second vertical synchronization signal, as at least part of the applying of the second self-capacitance measurement signals corresponding to the second combination of phases.

17. The electronic device of claim 16, wherein the specified number corresponds to a period during which the display driving IC outputs a signal for display update.

18. The electronic device of claim 12, wherein the touch sensor IC is configured to:
apply the first self-capacitance measurement signals based on the reception of the first vertical synchronization signal from the display driving IC, as at least part of the applying of the first self-capacitance measurement signals corresponding to the first combination of phases, and
apply the second self-capacitance measurement signals before receiving the second vertical synchronization signal from the display driving IC, as at least part of the applying of the second self-capacitance measurement signals corresponding to the second combination of phases.

19. A structure of an electronic device comprising:
a substrate on which a thin film transistor (TFT) structure for displaying at least one screen is disposed;
an encapsulation layer disposed on the TFT structure;
a touch sensor disposed on the encapsulation layer and including a plurality of electrodes; and
an integrated circuit configured to identify an input position on the touch sensor and provide at least one driving signal to the TFT structure,
wherein the integrated circuit is configured to:
provide a plurality of first self-capacitance measurement signals having to a first phase to at least some first electrodes of the plurality of electrodes with a first periodicity, based on a first vertical synchronization signal, and
provide a plurality of second self-capacitance measurement signals having to a second phase different from the first phase to at least some second electrodes of the plurality of electrodes with the first periodicity, after providing the plurality of first measurement signals, and
wherein at least some of application periods of the plurality of first driving signals and the plurality of second driving signals overlap with at least part of an application period of the at least one driving signal.

20. The structure of claim 19, further comprising a ground plate electrically coupled to the plurality of electrodes and electrically coupled to the TFT structure.

* * * * *